United States Patent [19]

Satomura

[11] 3,856,757

[45] Dec. 24, 1974

[54] LIGHT-SENSITIVE HIGH POLYMER COMPOUND AND PROCESS FOR THE PREPARATION THEREOF

[75] Inventor: Masato Satomura, Saitama, Japan

[73] Assignee: Fuji Photo Film Co., Ltd., Kanagawa, Japan

[22] Filed: Aug. 30, 1973

[21] Appl. No.: 393,088

[30] Foreign Application Priority Data
Aug. 31, 1972   Japan.............................. 47-86688

[52] U.S. Cl. .......... 260/77.5 CR, 117/124, 117/127
[51] Int. Cl. ........................................... C08g 22/12
[58] Field of Search .............................. 260/77.5 CR

[56] References Cited
UNITED STATES PATENTS
3,697,312   10/1972   Johnson et al. ............. 260/77.5 CR Primary Examiner—M. J. Welsh
Attorney, Agent, or Firm—Sughrue, Rothwell, Mion, Zinn & Macpeak

[57] ABSTRACT

A process for preparing a light-sensitive high molecular weight polymer compound, which comprises reacting an α, β-unsaturated carboxylic acid with an aliphatic or aromatic diepoxide to form the corresponding diol compound and reacting a diisocyanate compound with said diol compound and a process for preparing the light-sensitive high molecular weight polymer compounds, and to the novel polymer compounds produced.

10 Claims, No Drawings

LIGHT-SENSITIVE HIGH POLYMER COMPOUND AND PROCESS FOR THE PREPARATION THEREOF

BACKGROUND OF THE INVENTION

1. Field of the Invention

The present invention relates to a process for synthesizing novel light-sensitive high molecular weight polymer compounds synthesized from a diol compound having unsaturated acid ester groups, and to the novel polymer compound produced.

2. Description of the Prior Art

Heretofore, for synthesizing high polymer compounds having cinnamic ester groups, studies on the introduction of cinnamic ester groups into a polycondensation-type high polymer using a polymer reaction (e.g., as reported in Kikuchi, et al.; "Journal of Chemical Industry," vol.68, p387 (1965)) and inventions relating to a condensation reaction using cinnamylidenemalonic acid having a chemical structure analogous to that of cinnamic acid (e.g., as disclosed in U.S. Pat. No. 2,759,820 and French Pat. No. 1,351,542) are known.

However, since these are condensation reactions, it is necessary to remove the low molecular weight compounds formed as by-products, which complicates the reaction procedure. In addition, in order to remove the low molecular weight compounds, considerably high temperature is required (e.g., 200°C in Kikuchi et al, supra), and hence the reaction procedure becomes extremely difficult with compounds which tend to undergo decarboxylation, such as cinnamylidenemalonic acid. Furthermore, in these reactions, there has been the disadvantage that at most only one functional group, calculated per condensation unit, can be introduced.

Still further, as to the process for synthesizing a light-sensitive high polymer using as a starting material a diol compound having unsaturated acid ester groups in the molecule thereof, almost no studies have so far been undertaken due to chemical synthesis difficulties.

SUMMARY OF THE INVENTION

The present invention provides a high molecular weight polymers, as examples, containing units of the general formula

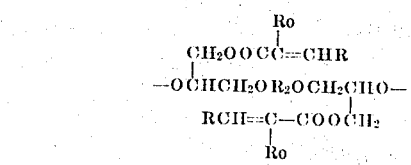

containing units of the general formula

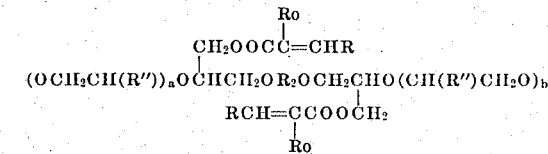

containing units of the general formula

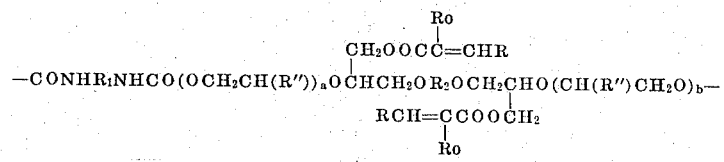

containing units of the general formula

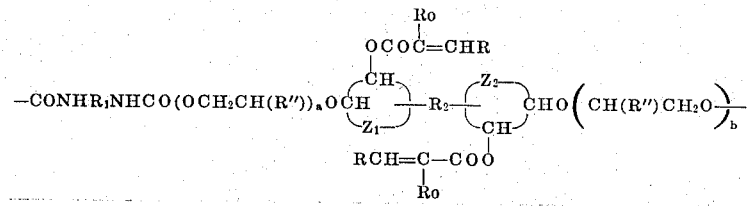

wherein R, Ro, $R_1$, $R_2$, $R_3$, $R_4$, $R_1'$, R'', $Z_1$, $Z_2$ and $a$, $b$ are as hereinafter defined.

The present invention also is concerned with a process for synthesizing the high molecular weight polymers employing a polyaddition reaction and using a diol compound having unsaturated acid ester groups with a diisocyanate as a starting material.

The present invention provides a novel functional group containing polymers obtained from a low molecular weight diol compound having two unsaturated acid ester groups and a diisocyanate.

That is, the present invention is concerned with a functional group containing polymer (such as a light sensitive polymer, a photohardenable varnish)) obtained by reacting an unsaturated acid with an aliphatic or aromatic diepoxy compound to produce a first diol compound and, if desired, further reacting the resulting diol compound with a monoepoxy compound to produce a second diol compound and reacting a diisocyanate compound with either the first or the second diol compound in the presence or absence of a diamine, an aminoalcohol and/or another diol.

One process for preparing the novel functional group containing polymers of the present invention involves the following reaction schematic illustrated using a diglycidyl ether (as representative of the diepoxy compound), cinnamic acid (as representative of the unsaturated acid) and ethylene oxide (as representative of the monoepoxy compound):

(1) 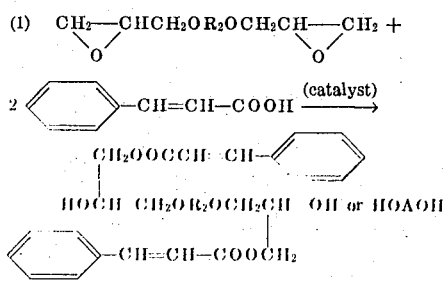

The product obtained above, for simplicity, can be designated HOAOH wherein A represents the

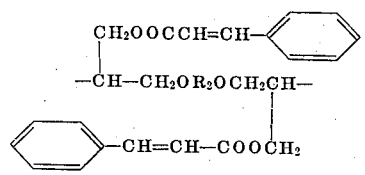

grouping,
or more generally the

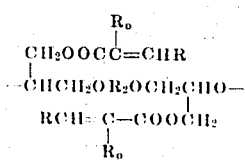

grouping for the unsaturated carboxylic acids of this invention where the

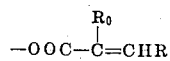

moiety represents the residue derived from the unsaturated acid and the

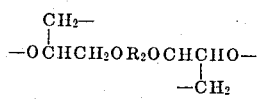

moiety represents the grouping or residue from the diglycidyl compound when a diepoxide compound of the formula

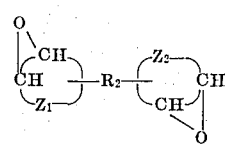

is used the

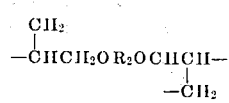

moiety above described becomes the

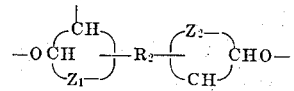

moiety;

(1') 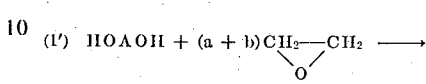

or more generally

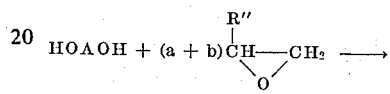

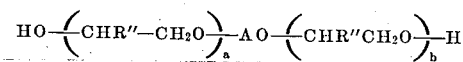

wherein the $+CHR''-CH_2O+$ moiety is the residue derived from a monoepoxide compound (2) 
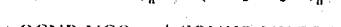

or (2') 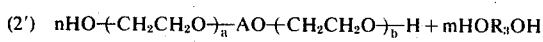

→ a polymer containing the following units

| | Content Molar Ratio |
|---|---|
| $-CONHR_1NHCOO+CH_2CH_2O+aAO$ $(CH_2CH_2O)b-$ | n |
| $-CONHR_1NHCOOR_3O-$ | m |
| $-CONHR'_1NHCONHR_4NH-$ | p |

More generally in the above reaction schematics (2) and (2') the moiety $+CH_2CH_2O+$ can be the moiety $+CHR''CH_2O+$ for the use of monoepoxides in general; and A equaling the

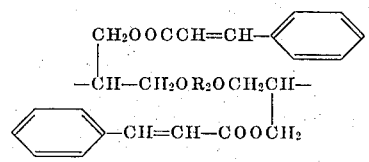

grouping can be more generally the

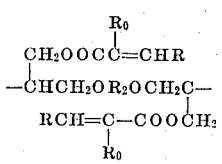

grouping wherein the RCH=C(R₀)—COO— moiety represents the residue derived from the unsaturated carboxylic acids of this invention in general and

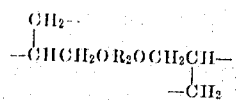

grouping represents the residue or grouping derived from the use of a digylcidyl compound with the latter becoming the

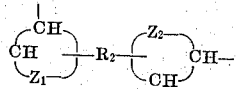

moiety or grouping where a diepoxide of the formula

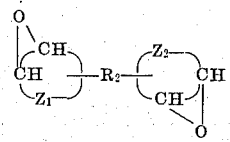

is used as the diepoxide.

In the above formulae, $R'_1$, and $R_1$ each represents an alkylene group, a phenylene group, a toluylene group, a naphthylene group, a methylenebisphenylene group or the like; $R_2$ represents an alkylene group, a $(C_2H_4O)pC_2H_4$— group, a $(C_3H_6O)$ $pC_3H_6$— group, phenylene group or the like; $R_3$ and $R_4$ each represent an alkylene group, an alkyleneoxyalkylene group, a phenylene group or the like; a and b are integers where $a + b$ is 0, 1, 2, 3, 4, or 5, and n, m, and p represent molar proportions in which $n/n+m+p$ is 0.01 to 1.0, preferably 0.1 to 0.8. Preferably $(m+p)/(n+m+p)$ is about 0.99 to 0, preferably about 0.9 to 0. A polymer having an intrinsic viscosity [η] (as measured at 30°C in dimethylformamide or methyl ethyl ketone) larger than 0.01 is generally suitable, preferably larger than 0.05.

Reaction (1) shows the process wherein a diol is produced by the ring opening reaction of the two epxoy rings due to the reaction between the two epoxy groups and the carboxyl group, Reaction (1') shows the process wherein a primary aliphatic diol is produced by the reaction between the diol so formed in Reaction (1) and the ethylene oxide. Suitable other materials which can be used in place of the ethylene oxide are propylene oxide, butylene oxide and epichlorohydrin and the residue or grouping derived therefrom being represented by the ―CHR''—CH₂O― moiety wherein R'' is a methyl group, an ethyl group or a chlorine atom.

In the above described Reactions (1) and (1') the reaction temperatures generally employed are from about 40°C to about 200°C, preferably about 65°C to about 150°C, the molar ratio of the diepoxy compound to the acid is generally from about 2.5 to 1.0, preferably about 2.0 to 1.5, the amount of the catalyst is generally from about 0.1 to 15, preferably 0.5 to 3, percent by weight based on the total weight of reactants and generally the concentration of reactants in the solvent will be from about 5 to 100 percent, preferably 20 to 80 percent, by weight to the solvent.

Reaction (2) shows the process wherein the polyaddition reaction between a diisocyanate and the diol produced in processes (1) or (1') to produce a polyurethane with unsaturated acid ester groups.

Reaction (2') shows the process wherein a modification of reaction (2) is applied, that is, another diol, an aminoalcohol, a diamine or a plurality of diisocyanates are used.

The reaction temperatures generally employed in Reaction (2) and (2') are from about −10°C to 150°C, preferably about 20°C to 120°C, the molar ratio of the diol to the diisocyanate is generally about 2 to 0.5 preferably about 1.2 to 0.9, and the amount of the catalyst generally ranges from about 0.1 to 15 preferably about 0.5 to 5, percent by weight based on the total weight of the reactants.

The unsaturated acid used in the present invention can be chosen from one or more α,β-unsaturated acids such as cinnamic acid, α-cyanocinnamic acid, furylacrylic acid, thienylacrylic acid, cinnamylideneacrylic acid, furylpentadienoic acid, acrylic acid, crotonic acid, methacrylic acid, sorbic acid, methoxycinnamic acid, nitrocinnamic acid, vinylcinnamic acid and the like. As described hereinbefore the residues derived from these acids can be generally represented by the moiety RCH=C(R₀)—COO— where R represents hydrogen, an methyl group, a CH₃CH=CH— group a phenyl group, a furyl group, a thienyl group, a C₆H₅CH=CH— group, a furyl —CH=CH group, or a thienyl —CH=CH group and R₀ represents a hydrogen atom, a methyl group, or a cyano group.

The diepoxy compound used in the present invention can be synthesized by reacting a diene with a peracid such as peracetic acid. Examples of suitable diepoxy compound include 1-vinyl-3-cyclohexene diepoxide, dicyclopentadiene diepoxide, 1,5-hexadiene diepoxide, bis(3,4-epoxycyclohexylmethyloxalate), bis(3,4-epoxycyclohexylmethylpimelate), 3,4-epoxy-5-methyl cyclohexylmethyl-3',4'-epoxy-5'-methyl cyclohexane carboxylate and the like. As described hereinbefore the residues derived from these can be diepoxy compounds can be designated by the

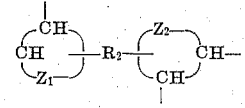

moiety where Z represents the group of atoms necessary to form a ring. Examples of these diepoxides are described in U.S. Pat. Nos. 2,750,395; 2,890,194; and 3,173,971.

Diglycidylethers are included within the scope of the term diepoxy compound and are also includes as diepoxy compounds which can be used in the invention. Suitable diglycidyl compounds used in the present invention can be synthesized by reacting an alcohol with epichlorohydrin in the presence of a base. Examples of suitable diglycidyl compounds include ethyleneglycol diglycidylether, diethyleneglycol diglycidylether, propylene glycol diglycidyl ether, polyethyleneglycol diglycidyl ether, butanediol diglycidyl ether, hexanediol diglycidyl ether, cyclohexane diol diglycidyl ether, bisphenol A diglycidyl ether, p,p'-dihydroxydiphenyl ether diglycidyl ether, dihydroxybenzene diglycidyl ether, diglycidyl aniline, ethyl diglycidyl phosphate and the like. suitable diglycidyl ether compounds are disclosed in U.S. Pat. No. 3,173,971, and in Cohen, *J. Am. Chem. Soc.*, 75 1733, 1952. Most of these compounds are commercially available as a raw material for epoxy type resins or adhesives. As described hereinbefore the residues or groupings derived from the diglycidyl ethers can be represented by the

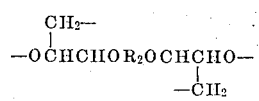

moiety
wherein $R_2$ is as hereinbefore defined.

The diepoxide, if desired, can be used alone or in combination with one or more additional diepoxides.

The diisocyanate used in the present invention can be synthesized by reacting a diamine with phosgene or by the thermolysis of a diazidocarbonyl compound.

Examples of suitable diisocyanates include hexamethylenediisocyanate, tolylenediisocyanate, naphthylene diisocyanate, diphenylmethanediisocyanate, dimethyldiphenyl methanediisocyanate, 2,4-tolylenediisocyanate dimer, propylene diisocyanate, butylenediisocyanate, 1,4-butyleneglycoldipropyl ether-ω,ω'-diisocyanate, dipropylether-ω,ω'-diisocyanate, 1,2'-dimethylcyclohexane-ω,ω'-diisocyanate, dipropylether-ω,ω'-diisocyanate, 1,2'-dimethylcyclohexane-ω,ω'-diisocyanate, benzophenonediisocyanate,, and the like. As described hereinbefore the residues or groupings derived from the diisocyanates can be represented by the

or the

wherein $R_1$ and $R'_1$ are as hereinbefore defined.

Many of these are industrially produced and are commercially availalbe as raw materials for polyurethanes. (See *Polyurethane*, Maki, 1968, Tokyo)

If desired, difunctional chloroformyl compounds can be used in combination with the diisocyanate. Examples of these difunctional chloroformyl compounds include terephthalic acid chloride, sebacic acid chloride, succinic acid chloride, adipic acid chloride, butanediol bis-chloroformate, hexanediol bis-chloroformate, dihydroxybenzene bis-chloroformate, xylyeneglycol bis-chloroformate and the like.

As the catalyst used in the reaction (1), bases, in general, such as the alkali metals, carboxylates, quarternary ammonium halides, alkali metal hydroxides, ammonium hydroxide, tertiary amines, and the like are suitable for use.

Examples of suitable tertiary amines as catalysts are dimethylbenzylamine, diethylbenzylamine, triethylamine, dimethylaniline, methyl morpholine, dimethylpiperazine, pyridine, isoquinoline, quinoline, picoline, lepidine, etc., of suitable alkali metal alkoxides are sodium methoxide, sodium ethoxide, potassium butoxide, etc., of alkali metal hydroxides are sodium hydroxide, potassium hydroxide, etc., of quarternary ammonium oxides and halides are trimethyl benzyl ammonium oxide, trimethylbenzyl ammonium chloride, tetraethyl ammonium chloride, etc., of alkali metals are lithium, sodium and potassium, of metal carboxylates are lithium acetate, sodium benzoate, potassium propionate, stannous acetate, etc.

For the compounds having the formula $HOR_3OH$, $H_2NR_4NH_2$ and $HOR_4NH_2$, $R_3$ to $R_4$ generally has 2 to 16 carbon atoms, preferably 4 to 15 carbon atoms. Specific examples are ethylene glycol, diethyleneglyclol, propylene glycol, butylene glycol, hexane diol, polyethyleneglycol, xylylene diol, aminoethanol, ethylenediamine, diaminobutane, di-aminoethyl ether, diaminobenzene, N-methyldiethanolamine, N-phenyldiethanolamine, dihydroxyethylaniline, hydroxyethylaniline and the like.

A catalyst is not necessary in reaction (2), but the compounds of metals such as tin, lead, bismuth, etc., amines or combinations thereof are effective as shown by various studies on the reaction between an alcohol and an isocyanate (e.g., Imoto, et al., *Synthetic Polymer*, vol.5, chap. 6, Asakura Shoten, Tokyo (1961)). Suitable such materials are dibutyltin diacetate, dimethyltin dichloride, dibutyltin dilaurate, tributyltin laurate, and dimethyl benzylamine.

Solvents employed in the reactions are those which do not have a hydroxy group or amino group to prevent side reactions. Examples of suitable solvents are ethers such as dimethoxyethane, diethoxyethane, etc., esters such as methoxyethanol acetate, ethoxyacetate ethanol, phenoxyethanol acetate, cyclohexyl acetate, butyl acetate, etc., aromatics such as benzene, toluene, xylene, ethylbenzene, chlorobenzene, etc., ketones such as acetone, acetophenone methyl ethyl ketone, methyl butyl ketone, trichloroethylene, etc., aprotic polar solvents such as dimethylformamide, dimethylacetamide, N-methyl pyrrolidone, dimethyl sulfoxide and the like.

As is described above, since the present invention employes as poly-addition reaction, it provides the advantage that almost no low molecular weight by-product is produced, resulting in an elimination of the disadvantages encountered in polycondensation reactions and, in addition, the present invention enables the introduction of two functional groups per polyaddition unit. Further, it has the advantage that resistance to solvents is improved due to the presence of the urethane bond in the main chain.

The functional group containing polymer of this invention is useful as a light sensitive polymer to obtain a photo resist, a photo relief, a photographic material, a photohardenable material, a hardenable element, an electron beam hardenable material and the like.

As a functional group containing polymer, it is generally used in a form of a film or layer on a support or in a form of sandwich with two sheets or supports.

Suitable supports are plastic films such as those of polyester, polyurethane, polycarbonate, polyvinyl chloride and the like, glass, zinc, aluminum, and the like. The thickness of the light sensitive polymer of this invention generally is from 0.1 to 500 μ, preferably 2 to 10μ.

Activators including the aromatic-ketones nitroaromatics, acyl-aromatics or quinones such as benzophenone, xanthone, phenanthraquinone, pyrenequinone, benzoquinone, anthyaquinone, furyl, bizenzoyl, benzoin, benzoin butyl, nitro acenaphthene, nitrofluorene, picric acid, notroaniline, bezoyl acenaphthene, N-methylbenzoylmethylene naphthothiazoline, dimethyl-N-methylbenzoylmethylene indoline and the like can be employed. The activator can be used at a level of 0.1 to 10 percent, preferably 2 to 5 percent by weight, to the weight of the functional group containing polymer.

The present invention will now be illustrated in greater detail by reference to the following examples. Unless otherwise indicated, all parts and percents are by weight.

EXAMPLE 1

A three neck round bottom flask was equipped with a stirrer, a dropping funnel and a reflux condenser with a calcium chloride drying tube. To this flask were added 24.0 g (0.12 mol) of butanediol diglycidyl ether, 29.9 g (0.20 mol) of cinnamic acid and 60 cc of dimethylformamide. Further, 2 g. of dimethylbenzylamine was added thereto as a catalyst, and the reaction mixture was maintained thermostatically at 115°C for 12 hours with stirring. Subsequently, the reaction mixture was gradually cooled and, at 40°C, 16.8 g (0.10 mol) of hexamethylenediisocyanate diisolved in 40 cc of dimethylformamide was added dropwise thereto while stirring the mixture slowly. At this time, 7 drops of dibutyltin diacetate was added thereto. After maintaining the reaction system at 45°C for 15 hours, the contents of the flask were poured into a 500 ml of ethyl acetate to separate the high polymer compound produced. Thereafter, the ethyl acetate was removed by decantation, and the product was again dissolved in dimethylformamide followed by pouring into 300 ml ethyl ether containing 20 ml of methanol to remove the remaining minor amount of low molecular weight material. Thus, a slightly reddish orange, viscous product was obtained. The $[\eta]$ of the product measured in dimethylformamide at 30°C was 0.20.

EXAMPLE 2

In Example 1 the reaction was conducted using the glycidyl compound in a slight excess to the carboxylic acid, whereas this Example shows the reactants being used in equimolar amounts.

The same procedures as described in Example 1 were conducted except for using 20.0 g (0.10 mol) of butanediol diglycidyl ether and 29.9 g (0.20 mol) of cinnamic acid. The reaction temperature was reduced to 95°C. After maintaining the reaction mixture at this temperature for 12 hours, the temperature of the reaction system was reduced to 65°C and a solution prepared by dissolving 16.8 g (0.10 mol) of hexamethylenediisocyanate in 15 ml of dimethylformamide was gradually added dropwise thereto. As the catalyst, 2 g. of dibutyltin diacetate was used. After about 8 hours, the reaction mixture became quite viscous and, after about 9 hours, uniform stirring became difficult. Thereafter, 100 ml of dimethylacetamide was added thereto and the mixture was gradually cooled followed by a separation of the product in the same manner as described in Example 1. The product thus obtained appeared reddish orange and was difficult to dissolve in acetonitrile, benzene, ether, ethyl acetate, and the like while it dissolved in polar solvents such as dimethylformamide dimethylacetamide, N-methylpyrrolidone and dimethylsulfoxide. The $[\eta]$ of the product measured at 30°C in dimethylformamide was 0.17.

REFERENCE EXAMPLE

The following reference example ilustrates a use of the high molecular weight polymer compound of the present invention.

A photo cross-linking reaction was studied with respect to the high molecular weight polymer obtained as in Example 1.

That is, 5 g of the product obtained as in Example 1 was added to 5 cc of dimethylformamide to prepare a light-sensitive solution containing a 300 mg. of Michler's ketone as a light sensitizing agent. This solution was applied to a surfaceprocessed (anodized) aluminum plate in a thickness of 2 to 3$\mu$ and dried. Then, this plate was exposed through a line original for 2 minutes to light from a 450 W high pressure mercury lamp spaced at a distance of 15 cm. Subsequently, the plate was processed with methyl ethyl ketone containing a oleophilic magenta dye. Thus, there was obtained a distinct colored image on the aluminum plate since the exposed areas were difficult to dissolve due to the photo cross-linking reaction. The unexposed areas were washed away with methyl ethyl ketone.

While the invention has been described in detail and with reference to specific embodiments thereof, it will be apparent to one skilled in the art that various changes and modifications can be made therein without departing from the spirit and scope thereof.

What is claimed is:

1. A process for preparing a light-sensitive high molecular weight polymer compound, which comprises reacting an $\alpha,\beta$-unsaturated carboxylic acid with an aliphatic or aromatic diepoxide to form the corresponding diol compound and reacting a diisocyanate compound with said diol compound.

2. The process of claim 1, wherein said process comprises reacting an $\alpha,\beta$-unsaturated crboxylic acid selected from the group consisting of cinnamic acid, $\alpha$-cyanocinnamic acid, furylacrylic acid, thienylacrylic acid, cinnamylidenacrylic acid, furylpentadienoic acid, acrylic acid, crotonic acid, sorbic acid, methacrylic acid, methoxycinnamic acid, nitrocinnamic acid and vinylcinnamic acid with a diepoxide to produce a diol compound and subsequently reacting said diol compound with a diisocyanate selected from the group consisting of hexamethylenediisocyanate, tolylenediisocyanate, naphthylene diisocyanate, diphenylmethanediisocyanate, dimethyl diphenyl methanediisocyanate, 2,4-tolylenediisocyanate dimer, propylenediisocyanate, butylenediisocyanate, 1,4-butyleneglycoldipropylether-$\omega,\omega'$-diisocyanate, dipropylether-$\omega,\omega'$-diisocyanate, 1,2-dimethylcyclohexane-$\omega,\omega'$-diisocyanate and benzophenone diisocyanate.

3. The process of claim 2, wherein said diepoxide is selected from the group consisting of ethyleneglycol diglycidyl ether, diethyleneglycol diglycidyl ether, propyleneglycol diglycidyl ether, polyethyleneglycol diglycidyl ether, butanediol diglycidyl ether, hexanediol diglycidyl ether, cyclohexane diol diglycidyl ether, bisphenol A diglycidyl ether, p,p'-dihydroxydiphenylether diglycidyl ether, p,p'-dihydroxydiphenylether diglycidyl ether, dihydroxybenzene diglycidyl ether, diglycidylaniline, ethyl diglycidyl phosphate, 1-vinyl-3-cyclohexene diepoxide, dicyclopentadiene diepoxide, 1,5-hexadiene diepoxide, bis(3,4-epoxycyclohexylmethyl oxalate), bis(3,4-epoxycyclohexylmethylpimelate) and 3,4-epoxy-5-methyl cyclohexylmethyl-3',4'-epoxy-5'-methyl cyclohexane carboxylate.

4. The process of claim 2, wherein said diol is further reacted with a monoepoxide selected from the group consisting of ethylene oxide, propylene oxide, butylene oxide, epichlorohydrin prior to said reaction with diisocyanate to produce a second diol compound.

5. The process of claim 4, wherein said monoepoxide is ethylene oxide.

6. A polymer produced by the process of claim 1, wherein said polymer contains units having the following formula

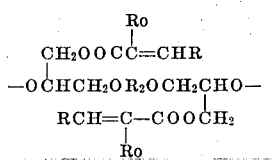

wheein the moiety RCH=C($R_o$)COO— is the residue derived from an $\alpha,\beta$-unsaturated carboxylic acid selected from the group consisting of cinnamic acid, $\alpha$-cyanocinnamic acid, furylacrylic acid, thienylacrylic acid, cinnamylidenacrylic acid, furlpentadienoic acid, acrylic acid, crotonic acid, methacrylic acid, sorbic acid, methoxycinnamic acid, nitrocinnamic acid and vinylcinnamic acid and wherein the moiety

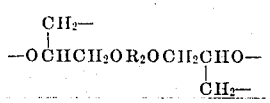

is the group derived from a diepoxed compound selected from the group consisting of ethyleneglycol diglycidyl ether, diethlene glycol diglycidyl ether, propylene glycoldiglycidyl ether, polyethyleneglycol diglycidyl ether, butanediol diglycidyl ether, hexanediol diglycidyl ether, cyclohexane diol diglycidyl ether, bisphenol A diglycidyl ether, p,p'-dihydroxydiphenylether diglycidyl ether, dihydroxybenzene diglycidyl ether, diglycidylamiline and ethyl diglycidyl phosphate.

7. A polymer produced by the process of claim 4, in which said monoexpoxide is ethylene oxide, wherein said polymer contains units of the following formula

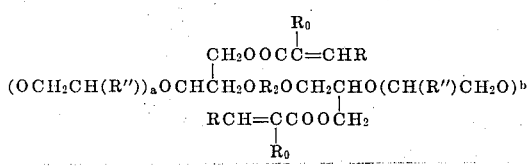

wherein the moeity RCH=C($R_0$)COO— is the residue derived from an $\alpha,\beta$-unsaturated carboxylic acid selected from the group consisting of cinnamic acid, $\alpha$-cyanocinnamic acid, furylacrylic acid, thienylacrylic acid, cinnamylideneacrylic acid, furylpentadienoic acid, acrylic acid, crotonic acid, sorbic acid, methoxycinnamic acid, nitrocinnamic acid and vinylcinnamic acid and, wherein the moeity

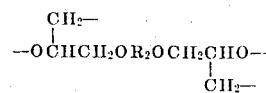

is the residue derived from a diepoxide compound selected from the group consisting of ethyleneglycol diglycidyl ether, diethyleneglycol diglycidyl ether, propylene glycoldiglycidyl ether, polyethyleneglycol diglycidyl ether, butanediol diglycidyl ether, hexanediol diglycidyl ether, cyclohexane diol diglycidyl ether, bishphenol A diglycidyl ether, p,p'-dihydroxydiphenylether diglycidyl ether, dihydroxybenzene diglycidyl ether, diglycidylaniline and ethyl diglycidyl phosphate wherein the ($OCH_2CH(R'')$) moiety is the moiety derived from ethylene oxide, propylene oxide or epichlohydrin and wherein $a + b$ is an integer of 0, 1, 2, 3, 4 or 5.

8. A polymer containing units having the following formula

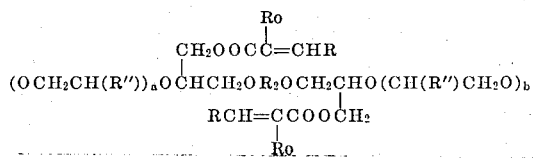

wherein the moiety RCH= C($R_o$) COO — is the residue derived from an $\alpha,\beta$-unsaturated organic carboxylic acid selected from the group consisting of cinnamic acid, $\alpha$-cyanocinnamic acid, furylacrylic acid, thienylacrylic acid, cinnamylideneacrylic acid, furylpentadienoic acid, acrylic acid, crotonic acid, sorbin acid, methoxycinnamic acid, methacrylic acid, nitrocinnamic acid and vinylcinnamic acid; wherein the moiety

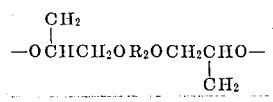

is the residue derived from a diepoxide compound selected from the group consisting of ethyleneglycol diglycidyl ether, diethyleneglycol diglycidyl ether, propylene glycoldiglycidyl ether, polyethyleneglycol diglycidyl ether, butanediol diglycidyl ether, hexanediol diglycidyl ether, cyclohexane diol diglycidyl ether, bisphenol A diglycidyl ether, p,p'-dihydroxydiphenylether diglycidyl ether, dihydroxybenzene diglycidyl ether, diglycidylaniline and ethyl diglycidyl phosphate; wherein the moiety —CONH—$R_1$NHCO— is the residue derived from a diisocyanate compound selected from the group consisting of hexamethylenediisocyanate, tolylenediisocyanate, naphthylene diisocyanate, diphenylmethanediisocyanate, dimethyl diphenyl methane diisocyanate, 2,4-tolylenediisocyanate dimer, propylene diisocyanate, butylenediisocyanate, 1,4- butyleneglycoldipropylether-$\omega,\omega'$-diisocyanate, dipropylether-$\omega,\omega'$-diisocyanate, 1,2-dimethylcyclohexane-$\omega,\omega'$-diisocyanate and benzophenone diisocyanate, wherein the ($OCH_2CH(R'')$) moiety is the moiety derived from ethylene oxide, propylene oxide or epichlorohydrin wherein $a + b$ is an integer of 0,1,2,3,4 or 5.

9. A polymer containing units having the following formula

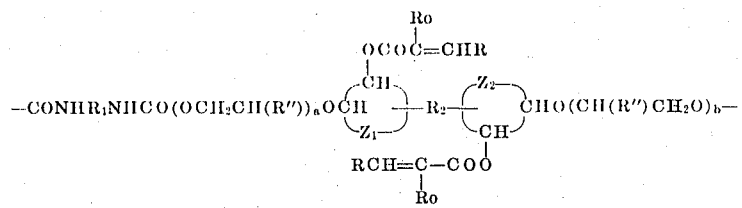

wherein the moiety RCH=C(R$_0$)COO— is the residue derived from an α,β-unsaturated organic carboxylic acid selected from the group consisting of cinnamic acid, α-cyanocinnamic acid, furylacrylic acid, thienylacrylic acid, cinnamylideneacrylic acid, furylpentadienoic acid, acrylic acid, crotonic acid, sorbic acid, methoxycinnamic acid, methacrylic acid, nitrocinnamic acid and vinylcinnamic acid; wherein the moiety —CONHR$_1$NHCO— is the residue derived from a diisocyanate compound selected from the group consisting of hexamethylenediisocyanate, tolylenediisocyanate, naphthylene diisocyanate, diphenylmethanediisocyanate, dimethyl diphenyl methanediisocyanate, 2,4-tolylenediisocyanate dimer, propylenediisocyanate, butylenediisocyanate, 1,4-buthyleneglycoldipropylether-ω,ω'-diisocyanate, 1,2-dimethylcyclohexane-ω,ω'-diisocyanate and benzophenone diisocyanate; and the moiety

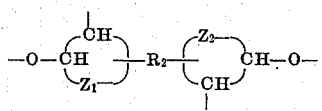

is the residue derived from a diepoxide compound selected from the group consisting of 1-vinyl-3-cyclohexene diepoxide, dicyclopentadiene diepoxide 1,5-hexadiene diepoxide, bis(3,4-epoxycyclohexylmethyloxalate), bis(3,4-epoxycyclohexylmethylpimelate) and 3,4-epoxy-5-methylcyclohexylmethyl-3'4'-epoxy-5'-epoxy-5'-methyl cyclohexane carboxylate, wherein the (OCH$_2$CH(R'')) moiety is the moiety derived from ethylene oxide propylene oxide or epichlorohydrin and wherein a + b is an integer of 0, 1, 2, 3, 4 or 5.

10. A process for preparing a light-sensitive high molecular weight polymer compound which comprises reacting an α,β-unsaturated carboxylic acid Z—COOH with an aliphatic or aromatic diepoxide

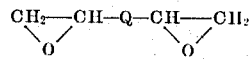

to form the corresponding diol compound

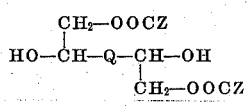

and reacting a diisocyanate compound with said diol compound, wherein Z represents the portion of said carboxylic acid attached to the carboxyl group thereof and Q represents the portion of said diepoxide between the terminal epoxy groups thereof.

* * * * *